(12) United States Patent
Ajmera

(10) Patent No.: US 11,726,469 B2
(45) Date of Patent: Aug. 15, 2023

(54) ERROR-BASED METHOD FOR CALCULATING A REMAINING USEFUL LIFE OF AN APPARATUS

(71) Applicant: Atos Global IT Solutions and Services Private Limited, Navi Mumbai (IN)

(72) Inventor: Abhinav Ajmera, Pune (IN)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 17/342,693

(22) Filed: Jun. 9, 2021

(65) Prior Publication Data
US 2022/0011766 A1    Jan. 13, 2022

(30) Foreign Application Priority Data
Jul. 8, 2020    (EP) .................................... 20184689

(51) Int. Cl.
 G05B 23/02    (2006.01)
 F03D 17/00    (2016.01)
 G06N 20/00    (2019.01)

(52) U.S. Cl.
 CPC ......... G05B 23/0283 (2013.01); F03D 17/00 (2016.05); G06N 20/00 (2019.01)

(58) Field of Classification Search
 CPC ...... G05B 23/0283; F03D 17/00; G06N 20/00
 See application file for complete search history.

(56) References Cited

U.S. PATENT DOCUMENTS 5,210,704 A *   5/1993  Husseiny ............... G01H 1/003
                                               706/912
7,904,756 B2 *  3/2011  Dilman ............... G06F 11/0793
                                               714/38.1

(Continued)

FOREIGN PATENT DOCUMENTS

EP       3309682          4/2018
EP       3309682 A1 *     4/2018   ......... G05B 23/0264

(Continued)

OTHER PUBLICATIONS

European Search Report issued in EP20184689.6 dated Dec. 16, 2020 (7 pages).

*Primary Examiner* — Kyle R Quigley
*Assistant Examiner* — Aeysha N Sultana
(74) *Attorney, Agent, or Firm* — Arc IP Law, PC; Joseph J. Mayo

(57) ABSTRACT

A method for calculating a remaining useful life of an apparatus comprises the following steps. Time-series of previous runs and a current run of the apparatus are provided containing data of sensors configured to monitor parameters of the apparatus. An error occurs when a parameter breaches a threshold. Cumulative counts of errors occurring during a run are calculated. A linearly decreasing remaining useful life is calculated for previous runs. Breakdowns of the apparatus are mapped in an error space. Each dimension of the error space refers to one type of an error. The breakdown points are mapped at coordinates which represent cumulative error counts at the time of the breakdowns. A test point representing cumulative error counts of the current run is mapped. At least two nearest breakdown points to the test point are identified. The remaining useful life of the apparatus is calculated based on the nearest breakdown points.

13 Claims, 7 Drawing Sheets

(56) References Cited

U.S. PATENT DOCUMENTS

| | | | | |
|---|---|---|---|---|
| 8,494,810 B2* | 7/2013 | Goldfine | ............ | G07C 3/00 |
| | | | | 702/183 |
| 10,527,520 B2 | 1/2020 | Poon et al. | | |
| 2010/0143136 A1* | 6/2010 | Daniels | ............ | F03D 7/0224 |
| | | | | 29/889 |
| 2011/0153096 A1* | 6/2011 | Pal | ............ | F03D 7/047 |
| | | | | 290/44 |
| 2013/0097128 A1* | 4/2013 | Suzuki | ............ | G06F 16/2365 |
| | | | | 707/693 |
| 2020/0004435 A1* | 1/2020 | Borlick | ............ | G06F 3/0653 |

FOREIGN PATENT DOCUMENTS

| | | |
|---|---|---|
| GB | 2491045 | 11/2012 |
| WO | 2013044925 | 4/2013 |

\* cited by examiner

ERROR-BASED METHOD FOR CALCULATING A REMAINING USEFUL LIFE OF AN APPARATUS This application claims foreign priority to European Patent Application No. 20184689.6 filed on Jul. 8, 2020, the specification of which is hereby incorporated herein by reference.

BACKGROUND OF THE INVENTION

Field of the Invention

At least one embodiment of the invention relates to an error-based method for calculating a remaining useful life of an apparatus.

With the advancement of using machine learning and artificial intelligence in the field of manufacturing, one critical use case is to predict a remaining useful life of various components based on sensor data captured from these components. This is important for industries like wind power generation where power plants are under contractual obligation to produce the committed power. Wind power plants can reduce unscheduled downtime due to component failures by predicting the remaining useful life of components. Predicting the remaining useful life of components also helps in inventory management and improve overall operational efficiency of the wind power plants. One critical component of a wind turbine is its pitch system. Hence, this invention is based on the objective to calculate the remaining useful life of pitch systems of wind turbines. However, at least one embodiment of the invention is not restricted to pitch system of wind turbines or wind turbines. Rather, the remaining useful life of any machine or apparatus comprising electromechanical components can be calculated.

Description of the Related Art

While machine learning and artificial intelligence is a relatively new field and in active research, previous research to find the remaining useful life of components is done using vibrational data with unsupervised learning. However, in the case discussed here, calculating the remaining useful life of a pitch systems faces the following challenges.

First of all, not all wind turbines are equipped with sensors capturing vibrational data. Vibrational data is a good indicator of mechanical failure but not electro-mechanical failures. Also, for supervised learning, sensor data does not provide values for remaining useful life.

Second, sensor data often covers key performance indicators of an apparatus which are reactive in nature (e.g. temperatures) and thus are less vital in providing an advanced indicator of failure. Third, wind turbines and other machines are subjected to harsh weather conditions which cannot be predicted with higher accuracy.

To resolve these issues, one approach is to interpolate the remaining useful life between breakdowns of an apparatus either linearly or exponentially for deriving a target variable of a training data for machine learning. However, the remaining useful life calculated using this approach does not represent the useful life accurately at each time due to the following reasons: The useful life of wind turbines is not only decreasing with time but is also dependent on the extreme conditions it is subjected to. Also, the linear and exponential remaining useful life depend on the overall duration of turbine run and different turbine runs can have different values of linear or exponential remaining useful life for the same sensor data. This can be confusing for machine learning models that will use the linear or exponential remaining useful life value as a target variable for supervised learning against the sensor data.

BRIEF SUMMARY OF THE INVENTION

One objective of at least one embodiment of the invention is to specify an improved method for calculating a remaining useful life of an apparatus. This objective is solved by an error-based method for calculating a remaining useful life of an apparatus, with the features of the independent claim 1. Advantageous embodiments of the method are specified in the dependent claims.

A computer implemented error-based method for calculating a remaining useful life of an apparatus comprises the following steps. Acquired time-series of previous runs of the apparatus are provided containing data of a plurality of sensors of the apparatus. Also, a time series is acquired containing data of the sensors with respect to a current run of the apparatus. Each sensor is configured to monitor a parameter of the apparatus or a parameter of an environment of the apparatus, respectively. Cumulative counts of errors occurring during a run of the apparatus are calculated and provided within the time series for each type of an error, respectively. An error occurs when a parameter monitored by a sensor breaches a pre-defined threshold. A linearly decreasing remaining useful life is calculated for each previous run of the apparatus indicating breakdowns of the apparatus by a value of zero and provided within the time series. The breakdowns of the apparatus are mapped as points in an n-dimensional error space. Each dimension of the error space refers to one type of an error, respectively. The breakdown points are mapped at coordinates which represent cumulative error counts at the time of the breakdowns. A test point is mapped in the error space, too. The test point represents cumulative error counts for the apparatus in operation. At least two nearest breakdown points with respect to the test point are identified by calculating and comparing distances of the test point to all breakdown points mapped in error space. The remaining useful life of the apparatus is calculated. The remaining useful life is a function of a quotient of a distance of the test point to an origin of the error space and a mean distance of the at least two nearest breakdown points to the origin of the error space.

According to an embodiment the remaining useful life is given by a product of a mean operation time of all available runs of the apparatus and a difference between the quotient and one.

In an embodiment relative error weights are considered for mapping points in the error space.

In an embodiment the relative error weights are based on temporal distances between errors and breakdowns. An error occurring temporarily close to a breakdown will be more important with respect to a breakdown than an error occurring temporarily far away from the breakdown. Advantageously, the calculated remaining useful life can be more precise when considering the temporal distances of errors to breakdowns.

In an embodiment relative error weights based on temporal distances between errors and breakdowns are considered as follows. Remaining times until a breakdown of the apparatus are determined for each type of an error. The remaining times are given by the value of the linearly decreasing remaining useful life at each time a number of errors is increasing by the value of one. The relative error weights are calculated based on the remaining times for each type of an error. The points are mapped in the error space at weighted coordinates.

In an embodiment the relative error weights are based on frequencies of the errors occurring. An error which occurs very often is less important with respect to a breakdown of the apparatus than an error occurring a lesser amount of times. Advantageously, the calculated remaining useful life can be more precise, when considering frequencies of the errors occurring.

In an embodiment relative error weights based on frequencies of the errors occurring are considered as follows. Remaining times until a breakdown of the apparatus are determined for each type of an error. The remaining times are given by the value of the linearly decreasing remaining useful life at each time a number of errors is increasing by the value of one. Parameters are calculated based on the remaining times for each type of an error, respectively. The relative error weights are calculated based on the parameters, wherein each relative error weight for a specific type of an error is indicative of the frequency of the error occurring. The points are mapped in error space at weighted coordinates.

In an embodiment total times are calculated for each type of an error by summing up the remaining times of the corresponding error. Each relative error weight for a specific type of an error is a logarithm of a quotient of a sum of the total times of all types of errors and the total time of the corresponding error. In another embodiment each relative error weight for a specific type of an error is some other function of the quotient of the sum of the total times of all types of errors and the total time of the corresponding error. Advantageously, in this case temporal distances of errors to breakdowns and frequencies of the errors occurring are considered. This can result in an even more precise and realistic calculated remaining useful life.

In an embodiment the time series include information about previous runs of at least one further apparatus of the same type as the apparatus equipped with a plurality of sensors. Advantageously, the calculated remaining useful life can be more precise, if additional data is provided relating to a similarly constructed apparatus. The contribution of each type of error can thus be more realistic.

In an embodiment the apparatus is a pitch system of a wind turbine.

According to an embodiment the method comprises the following further steps. Different categories for different time slots are determined according to the calculated remaining useful life. A supervised training of a machine learning algorithm is performed using the categories as target variables of a training data set. The training data set contains the time series.

In another embodiment the supervised training of the machine learning algorithm is performed using numerical values of the calculated remaining useful life as target variables of a training data set.

In an embodiment a category is predicted by the trained machine learning algorithm based on sensor data and error data of the apparatus in operation and the calculated remaining useful life of previous runs.

A system comprises a plurality of sensors, wherein each sensor is designed to monitor a parameter of an apparatus or a parameter of an environment of the apparatus, and means designed to perform method steps according to an embodiment of the method.

A computer program product comprises instructions which cause the system to carry out the method steps.

BRIEF DESCRIPTION OF THE DRAWINGS

The above-described properties, features and advantages of this invention and the way in which they are achieved will become clearer and more clearly understood in association with the following description of the exemplary embodiments which are explained in greater detail in association with the drawings. Here in schematic illustration in each case.

DETAILED DESCRIPTION OF THE INVENTION

Figure 1:
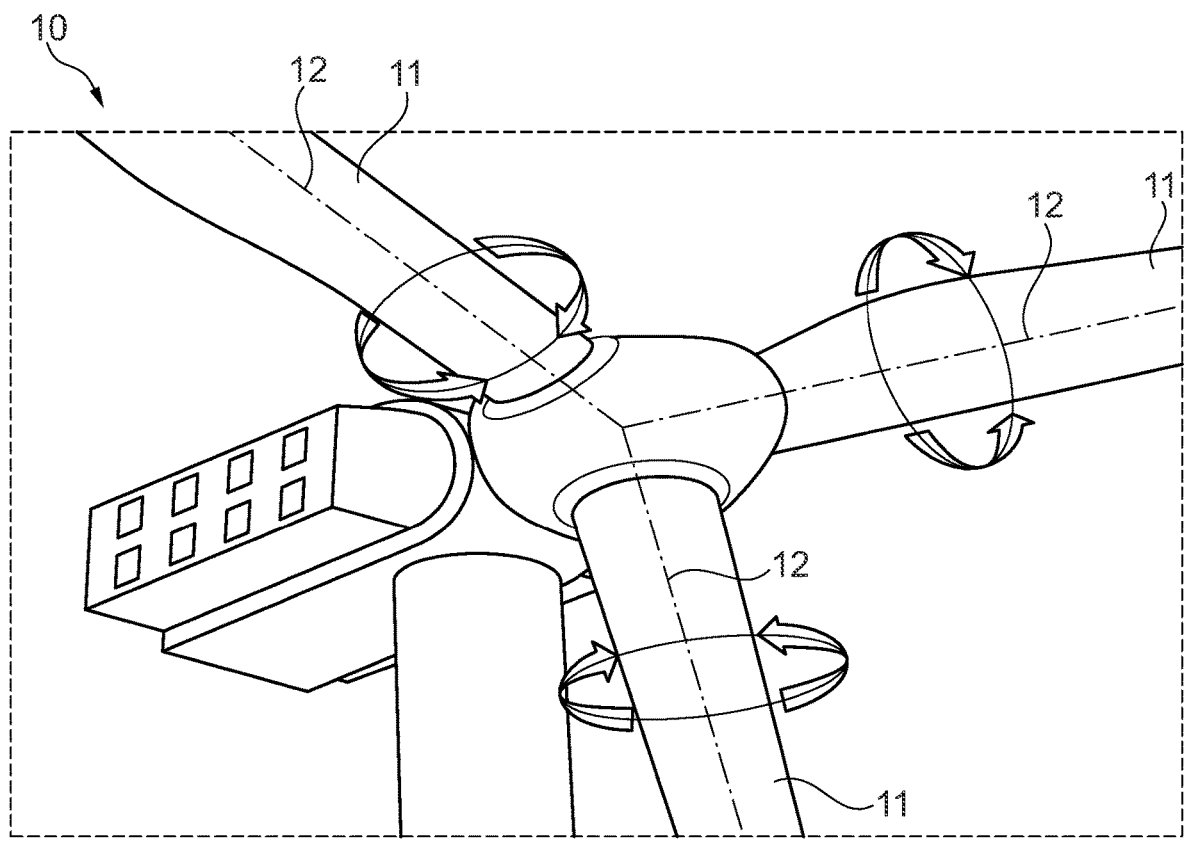
FIG. 1 shows a wind turbine in a perspective view.

FIG. 1 schematically shows a wind turbine 10 in a perspective view. As an example, the wind turbine 10 comprises three rotor blades 11. However, the wind turbine 10 may comprise any number of rotor blades 11. Each rotor blades 11 can be rotated around its long axis 12. Thus, a pitch angle of the rotor blades can be adjusted, e.g. according to a set of conditions. In FIG. 1 this is indicated by arrows. The wind turbine 10 comprises a pitch system which is a driver system designed to adjust the pitch angle of each rotor blade 11. The pitch system itself is not shown in FIG. 1.

In the following, an error based method for calculating a remaining useful life of the pitch system of the wind turbine 10 is presented. However, the method can also be applied for a calculation of a remaining useful life of any other components of the wind turbine 10 or even the whole wind turbine 10. The method also can be applied for the calculation of the remaining useful life of any other machine or apparatus. Especially, the method can be applied for an apparatus comprising moving electro-mechanical components.

Figure 2:
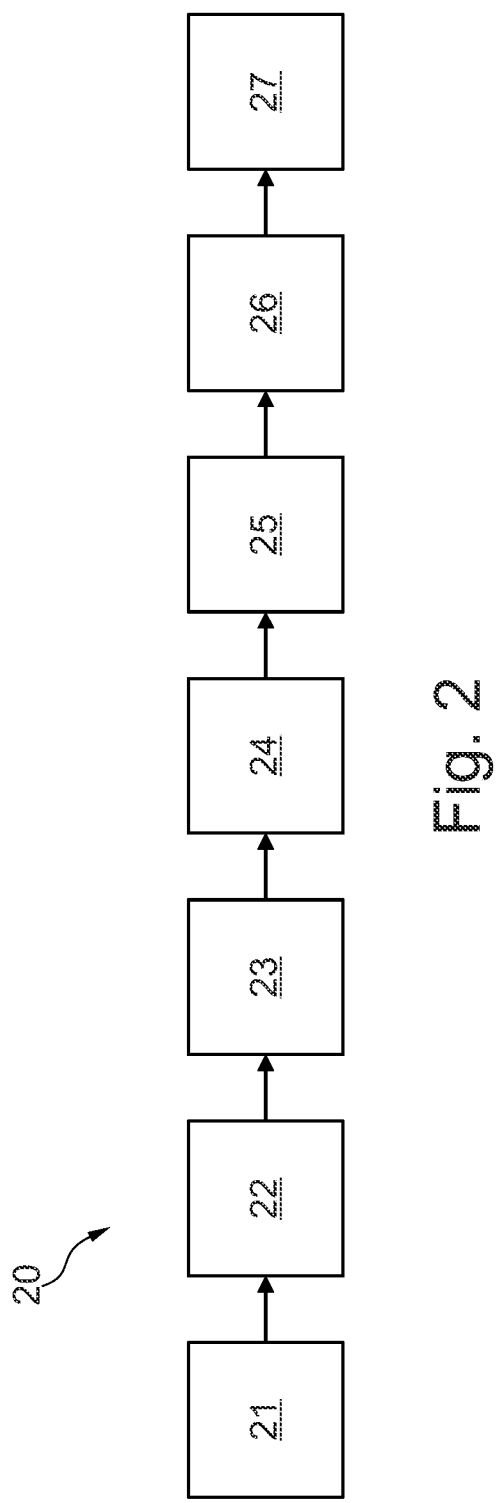
FIG. 2 shows method steps of a method for calculating a remaining useful life of an apparatus in a flow diagram.

FIG. 2 schematically shows method steps of the method 20 for calculating the remaining useful life of an apparatus, e.g. the wind turbine 10 of FIG. 1, in a flow diagram. In a first method step 21 acquired time-series of previous runs are provided and a time series 30 of a current run of the apparatus is acquired.

Figure 3:
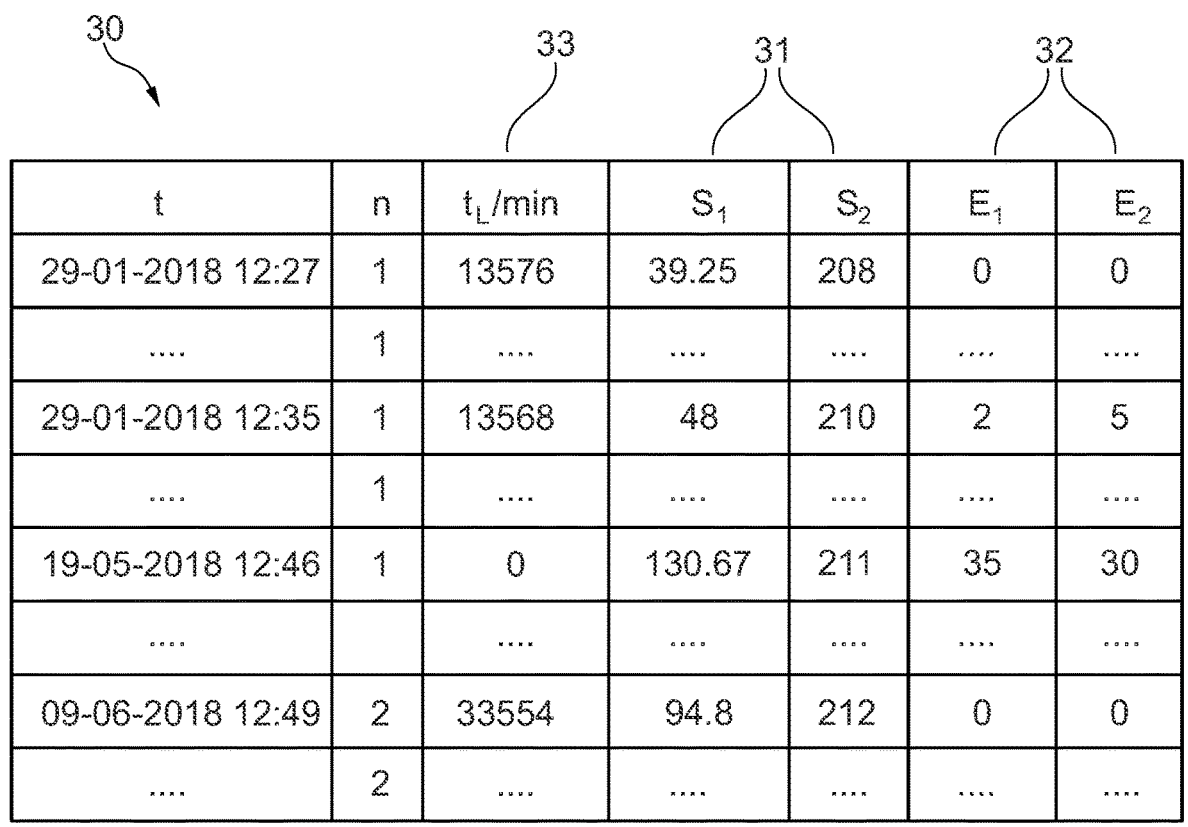
FIG. 3 shows a time series provided for calculating the remaining useful life.

FIG. 3 shows an exemplary time series 30 of previous runs and a current run of the apparatus. A run of the wind turbine 10 or the apparatus in general is defined as a period between 2 breakdowns when the apparatus is operational. A run of the apparatus is denoted by a number "n" in FIG. 3. The remaining useful life of the current run shall be calculated. As an example, only two previous runs of the apparatus are indicated in FIG. 3 although the time series 30 may comprise information about more runs of the apparatus.

The time series 30 contain data of a plurality of sensors of the apparatus. As an example, the apparatus is equipped with two sensors $S_1$ and $S_2$. However, the apparatus may comprise any number of sensors. Each sensor is configured to monitor a parameter of the apparatus or a parameter of an environment of the apparatus, respectively. A sensor may e.g. be configured to monitor a temperature of a component of the apparatus, e.g. a temperature of a motor of the apparatus. Apart from that, a sensor may be configured to monitor a velocity of a component of the apparatus such as a velocity of a rotor blade 11 of the wind turbine 10 of FIG. 1. The sensors can also monitor a temperature of the environment of the apparatus, a wind speed, a humidity and/or an amount of precipitation. Other parameters may also be monitored. The parameters can also be called key performance indicators In FIG. 3 exemplary values of the sensors are given which have no further meaning.

The time-series 30 further contain cumulative counts of errors $E_1$ and $E_2$ occurring during a run of the apparatus which are calculated in the first method step 21 and provided within the time series 30. An error occurs when a parameter monitored by a sensor breaches a pre-defined threshold. As an example, the time series 30 contain two different types of errors $E_1$ and $E_2$. For the sake of simplicity, the number of different types of errors has been chosen according to the number of sensors. However, the time series 30 may comprise any other number of different errors and their respective cumulative counts.

The cumulative error counts are good indicators of an overall state of the apparatus since an error when happening multiple times can lead to breakdown.

The time-series 30 also contain a linearly decreasing remaining useful life $t_L$ for each previous run of the apparatus calculated in the first method step 21 and provided within the time series 30. The linearly decreasing remaining useful life $t_L$ indicates breakdowns of the apparatus by a value of zero. On the other hand, the linearly decreasing remaining useful life is equal to a total duration of a run, e.g. in minutes, just when the apparatus restarts after breakdown. E.g. the linearly decreasing remaining useful life at the beginning of the second run is 33554 minutes indicating that the apparatus has been in operation for 33554 minutes in the second run before breaking down. This time linearly decreases until a breakdown.

The sensor values, the cumulative error counts and the linearly decreasing time are provided with a corresponding time t. E.g., a breakdown of the apparatus occurred on May 19, 2018 at 12:46. At this time, 35 errors of error type $E_1$ and 30 errors of error type $E_2$ have been counted and a breakdown of the apparatus occurred. The errors are counted from the time, a run of the apparatus started.

Figure 4:
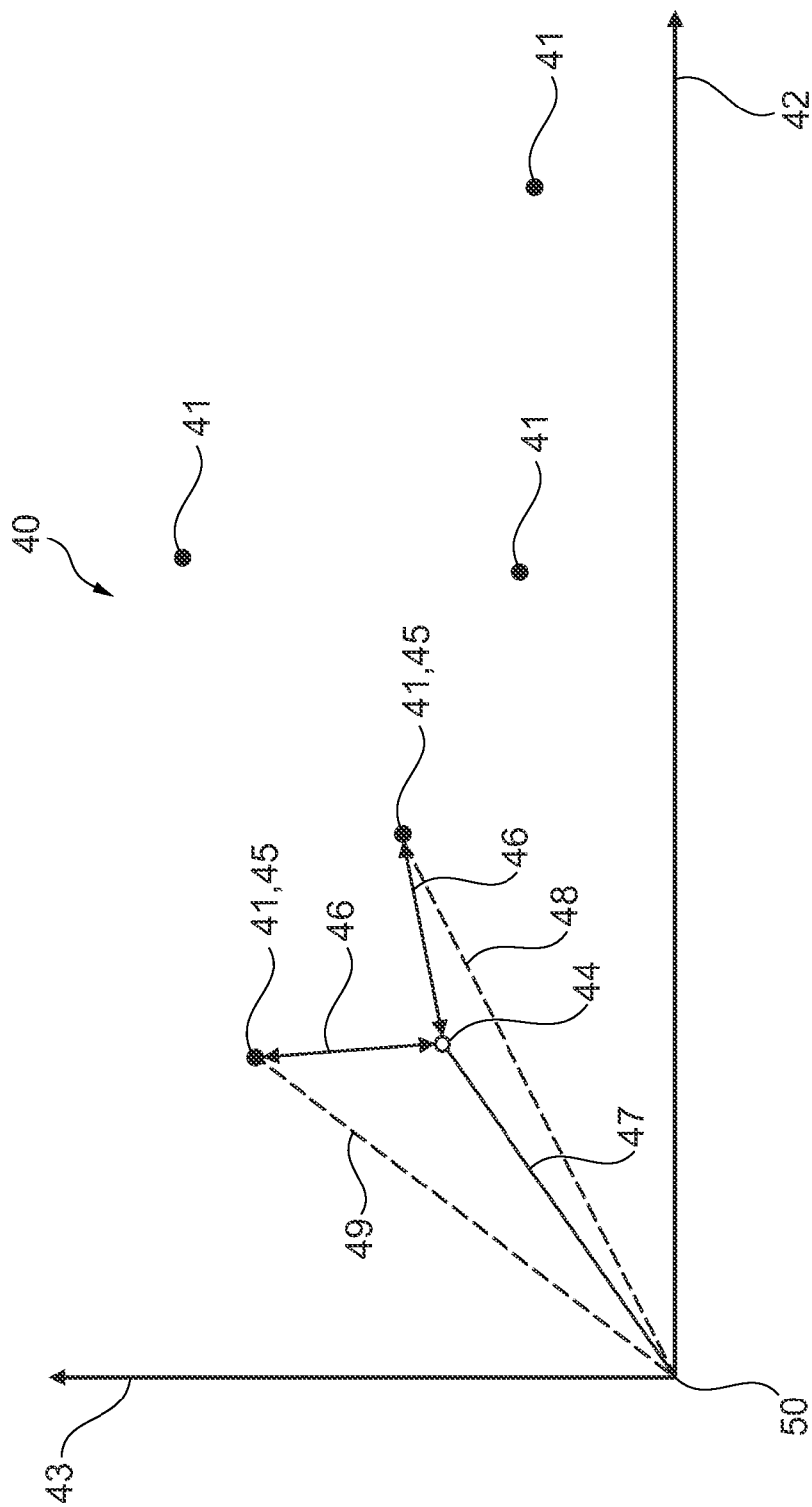
FIG. 4 shows an n-dimensional error space with breakdowns of an apparatus mapped as breakdown points and a test point traversing through the error space.

In a second method step 22 according to the method 20 of FIG. 2 the breakdowns of the apparatus are mapped as points in an error space. FIG. 4 shows the error space 40 and the mapped breakdown points 41.

The error space 40 comprises a number of dimension which is equal to the number of different types of errors within the time series 30. Each dimension of the error space 40 refers to one type of an error, respectively. The breakdown points 41 are mapped at coordinates which represent cumulative error counts at the time of the breakdowns. As the time series 30 of FIG. 3 contain cumulative counts of errors of two different types, the error space 40 is two-dimensional and comprises a first axis 42 and a second axis 43. However, the error space 40 may also comprise more than two dimensions. On the first axis 42 the cumulative counts of error type $E_1$ are applied. On the second axis 43 the cumulative counts of error type $E_2$ are applied. The breakdown points 41 are mapped at positions corresponding to the cumulative error counts at the breakdowns of the apparatus.

In a third method step 23 according to the method 20 of FIG. 2 a test point 44 is mapped in the error space 40. FIG. 4 shows the mapped test point 43 in the error space 40. The test point 44 represents cumulative error counts for the apparatus in operation for which the remaining useful life shall be calculated. At the start of a run, the error counts in each dimension is 0 and the test point 44 coincides an origin 50 of the error space. As the apparatus operates, different errors are encountered and thus, at any given point of time, the test point 44 has certain count of cumulative errors and is denoted at the coordinates reflecting error counts in each dimension. In other words, the test point will traverse the n-dimensional error space 40 from the origin 50 to a breakdown point 41 during the run. Hence, at any given point of time during the run, an error-based based remaining useful life can be calculated by measuring relative distance of the test point 44 to origin in comparison to its nearest breakdown points 41.

In a fourth method step 24 according to the method 20 of FIG. 2 at least two nearest breakdown points 45 with respect to the test point 44 are identified. FIG. 4 shows the at least two nearest breakdown points 45 in the error space 40. The at least two nearest breakdown points 45 are identified by calculating and comparing e.g. Euclidean distances 46 of the test point 44 to all breakdown points 41 mapped in error space 40. Instead of Euclidean distances 46 also other distances may be calculated. E.g., Manhattan distances, Mahalanobis distances, Minkowski distances or cosine distances may be calculated instead. In FIG. 4 only the distances 46 of the two nearest breakdown points 45 are shown. However, more than two nearest breakdown points 45 can be identified in the fourth method step 24, e.g. three, four or five nearest breakdown points 45. In the following, only two nearest breakdown points 45 are considered as an example.

In a fifth method step 25 according to the method 20 of FIG. 2 the remaining useful life of the apparatus is calculated. FIG. 4 shows a distance 47 of the test point 44 to an origin 50 of the error space 40. Distance 47 shall also be called "d". FIG. 4 also shows a distance 48 of a first nearest breakdown point 45 and a distance 49 of a second nearest breakdown point 45 to the origin 50 of the error space 40, respectively. Distance 48 shall also be called "$d_1$". Distance 49 shall also be called "$d_2$". The remaining useful life $t_{RUL}$ is a function of a quotient of the distance 47 (d) of the test point 44 to the origin 50 of the error space 40 and a mean distance $d_{mean}$ of the at least two nearest breakdown points 45 to the origin 50 of the error space 40:

$$t_{RUL}=f(d/d_{mean}), \text{ wherein } d_{mean}=(d_1+d_2)/2$$

The remaining useful life $t_{RUL}$ e.g. can be given by a product of a mean operation time $t_{mean}$ of all available runs of the apparatus included in the time series 30 and a difference between the quotient and one:

$$t_{RUL}=t_{mean}(d/d_{mean}-1)$$

However, any other suitable time can be used instead of the mean operation time $t_{mean}$ to calculate the remaining useful life based on the quotient. E.g. a median operation time $t_{median}$ of all available runs of the apparatus included in the time series 30 can be used instead of $t_{mean}$.

In the n-dimensional error space 40 the test point 44 will be nearer to the breakdown points 41 which have encountered similar types of errors as compared to errors occurred for the current run of the apparatus. Hence, a distance 46 to a nearest breakdown point denotes a probability of reaching the breakdown point with currently encountered types of errors. However, at the start of new run, since there are no errors encountered, the nearest breakdown point will be of the smallest run. This might give incorrect picture but, using a larger number of breakdown points 41 can dilute the importance of different types of errors encountered. Hence, at least two nearest breakdown points 45 are considered.

In second step 22 of the method 20 optionally also relative error weights of the different types of errors can be considered for mapping points 41, 44 in the error space 40. If relative error weights are considered the breakdown points 41 are mapped at coordinates which represent weighted cumulative error counts for the specific types of errors represented by the corresponding dimension of the error space 40 at the time of the breakdowns.

Figure 5:
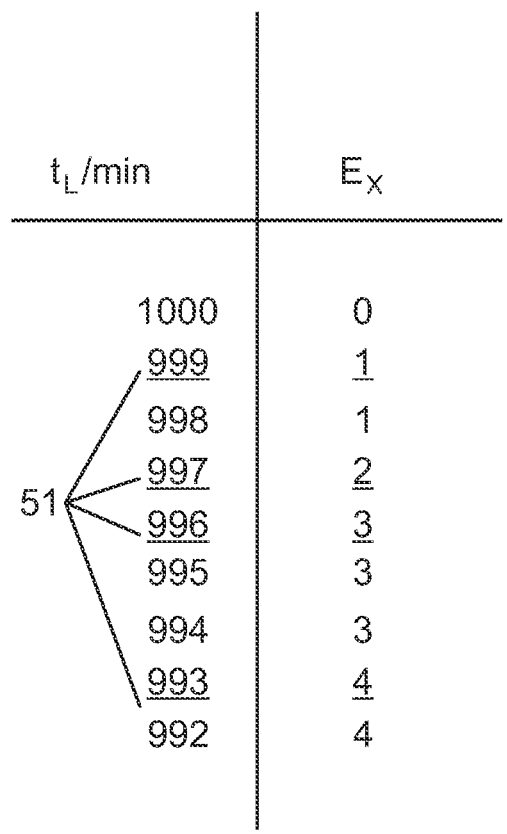
FIG. 5 shows a table for calculating relative error weights.

FIG. 5 shows a table in order to explain the consideration of relative error weights. In a left column of the table exemplary values of the linearly decreasing remaining useful life $t_L$ is shown in minutes. In a right column cumulative error counts of one error type are shown for the different times according to $t_L$.

According to one embodiment the relative error weights are based on temporal distances between errors and breakdowns. As an error occurring near a breakdown of the apparatus is more important than an error occurring away from the breakdown, the calculated remaining useful life is more accurate compared to a method wherein temporal distances between errors and breakdowns are not considered.

Relative error weights based on temporal distances between errors and breakdowns can be considered by determining remaining times 51 until a breakdown of the apparatus for each type of an error. The remaining times 51 are given by the linearly decreasing remaining useful life $t_L$ at each time a number of errors is increasing by the value of one, since the errors are counted cumulatively. The relative error weights are then calculated based on the remaining times 51 for each type of an error. Thus, a measure is available to consider how far an error occurred near a breakdown. As a relative error weight, e.g., a mean value of the remaining times 51 can be calculated. Then the points 41, 44 are mapped in error space 40 at weighted coordinates for each error.

In another embodiment the relative error weights are based on frequencies of the errors occurring. As an error occurring a greater number of times during a run is less important as compared to an error occurring a lesser number of times in the same run, the calculated renaming useful life is more accurate compared to a method wherein frequencies of the errors occurring are not considered.

Relative error weights based on frequencies of the errors occurring can be considered by determining the remaining times 51 and calculating parameters based on the remaining times 51 for each type of an error, respectively. The relative error weights are then calculated based on the parameters, wherein each relative error weight for a specific type of an error is indicative of the frequency of the error occurring. E.g., the parameters can be total count of the remaining times 51. Then the points 41, 44 are mapped in error space 40 at weighted coordinates for each error.

In an embodiment relative error weights are based on temporal distances between errors and breakdowns and the frequencies of the errors occurring. Advantageously, the importance of an error with respect to its temporal distance to a breakdown and its frequency of occurring are considered whereby the calculated remaining useful life may be even more accurate. In this case, e.g. total times are calculated for each type of an error by summing up the remaining times 51 of the corresponding error. E.g. according to the remaining times 51 of FIG. 5 the total time of error $E_X$ is 999+997+996+993=3985. The temporal distances of error $E_X$ to a breakdown are considered by using the remaining times 51. The frequency of error $E_X$ is considered by calculating the total time which is the sum of the remaining times 51. If e.g. the total time of a first error is 3985 and the total time of a second error is 100, the second error type is more crucial for the remaining useful life of the apparatus as the second error type is not occurring as frequently as the first error. Each relative error weight W for a specific type of an error $E_X$ is a logarithm of a quotient of a sum of the total times of all types of errors and the total time of the corresponding error:

$W(E_X)$=log(sum of all total times of all errors/total time of $E_X$)

Instead, each relative error weight W for a specific type of an error $E_X$ can also be some other function f of the quotient of the sum of the total times of all types of errors and the total time of the corresponding error:

$W(E_X)$=f(sum of all total times of all errors/total time of $E_X$)

Figure 6:
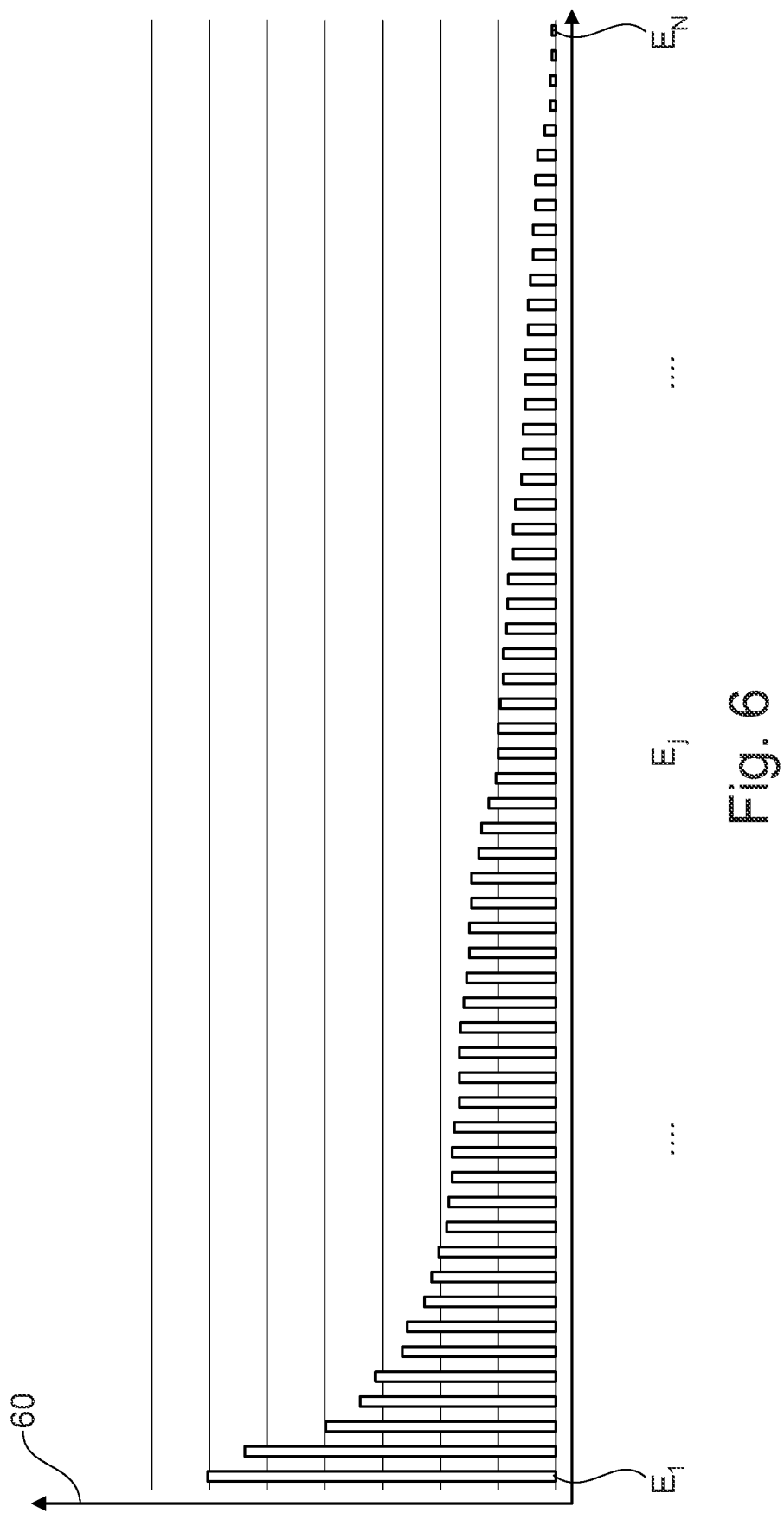
FIG. 6 shows a bar chart of relative error weights.

FIG. 6 shows an example for relative error weights 60 for a plurality of types of errors $E_1$ to $E_N$ in a bar chart. In this case, relative error weights for significantly more than two types of different errors are shown as an example. FIG. 6 shows that different errors can contribute differently to a breakdown of the apparatus. A higher relative error weight 60 of an error $E_1$ means that error $E_1$ is more important than an error $E_N$ having a lower error weight 60.

The time series can also include information about previous runs of at least one further apparatus of the same type as the apparatus equipped with a plurality of sensors. Thus, the calculated remaining life can be even more precise.

Figure 7:
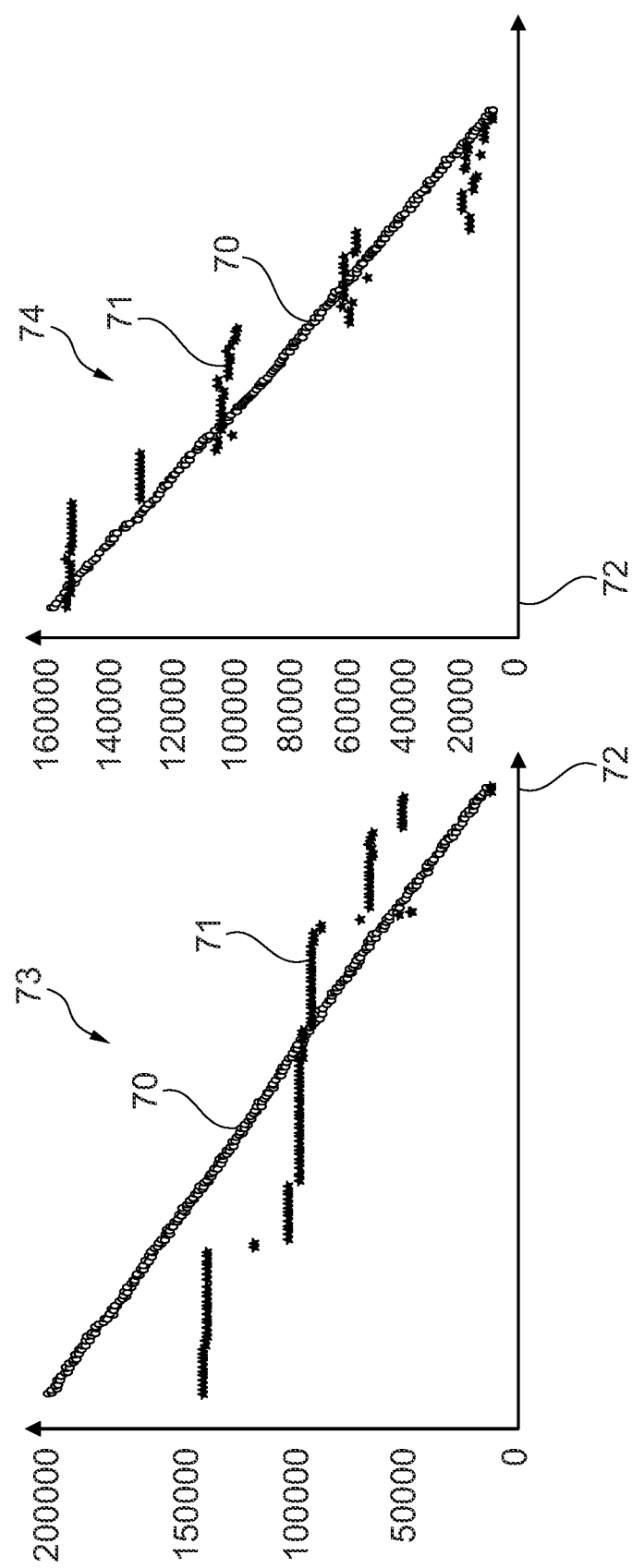
FIG. 7 shows results of the calculated remaining useful life.

FIG. 7 shows two diagrams, wherein each of the diagrams is showing a comparison between a linearly decreasing remaining useful life 70 and the calculated remaining life 71 of the apparatus. Each diagram is showing the results for different runs. On a horizontal axis 72, an elapsed time is plotted, for both diagrams respectively.

While the linearly decreasing remaining useful life 70 decreases in a linear fashion as time elapses, the error-based remaining useful life 71 decreases only when error conditions occur. The error-based remaining useful life 71 reflects more realistic state of equipment as it accounts for errors rather than a pure time-based approach.

For the linearly decreasing remaining useful life 70 approach, the overall range of remaining lifetime is different depending on the duration of the run of the apparatus. Thus, a first run 73 which lasted for 220,000 minutes (~153 days), the linearly decreasing remaining useful life 70 values are in the range of 220,000 minutes to 0 minutes. However, for a second run 74 which lasted for circa 160,000 minutes (~110 days) the linearly decreasing remaining useful life 70 values will be in the range from 160,000 to 0. This can create issues while training the a machine learning algorithm since the sensor data for both runs will be same near the start of run and will start deteriorating only when errors occur during the operation. Due to presence of different linearly decreasing remaining useful life 70 for same sensor data, the machine learning algorithm can get confused and fail to converge or read the pattern correctly. This problem is not present for the error-based remaining useful life 71 which has same range 148K to 0 for both the turbine runs and the value of the error-based remaining useful life 71 reflects the error conditions encountered so far in the run.

In an embodiment the method 20 according to FIG. 2 comprises an optional sixth step 26 of determining different categories for different time slots according to the calculated remaining useful life and performing a supervised training of a machine learning algorithm using the categories as target variables of a training data set. The training data set also contains the time series. A first category can e.g. correspond to a time slot of 0-10 days, a second category can correspond to a time slot of 10-30 days, a third category can correspond to a time slot of 30-60 etc.

In another embodiment the supervised training of the machine learning algorithm is performed using numerical values of the calculated remaining useful life as target variables of a training data set instead of using the categories of different time slots.

In a further optional seventh step 27 of the method 20 a category is predicted by the trained machine learning algorithm based on sensor data and error data of the apparatus in operation and the calculated remaining useful life of previous runs.

What is claimed is:

1. A computer implemented error-based method for calculating a remaining useful life of an apparatus comprising:
providing acquired time-series of previous runs of the apparatus containing data of a plurality of sensors of the apparatus and acquiring a time series containing the data of the plurality of sensors with respect to a current run of the apparatus,
wherein the apparatus is a pitch system of a wind turbine,
wherein each sensor of said plurality of sensors of the apparatus is configured to monitor a parameter of the apparatus or a parameter of an environment of the apparatus, respectively,
wherein cumulative counts of errors occurring during a run of the apparatus are calculated for each type of an error and provided within the time series,
wherein the error occurs when the parameter of the apparatus or the parameter of the environment of the apparatus as monitored by a sensor breaches a predefined threshold,
wherein a linearly decreasing remaining useful life for each previous run of the apparatus indicating breakdowns of the apparatus by a value of zero is calculated and provided within the time series,
mapping the breakdowns of the apparatus as points in an error space,
wherein each dimension of the error space refers to one type of the error, respectively,
wherein breakdown points are mapped at coordinates which represent cumulative error counts at times of the breakdowns,
mapping a test point in the error space, wherein the test point represents the cumulative error counts for the apparatus in operation,
identifying at least two nearest breakdown points with respect to the test point by calculating and comparing distances of the test point to all of the breakdown points mapped in the error space,
calculating the remaining useful life of the apparatus which is a function of a quotient of a distance of the test point to an origin of the error space and a mean distance of the at least two nearest breakdown points to the origin.

2. The computer implemented error-based method according to claim 1, wherein the remaining useful life is given by a product of a mean operation time of all available runs of the apparatus and a difference between the quotient and one.

3. The computer implemented error-based method according to claim 1, wherein relative error weights are considered for mapping the points in the error space.

4. The computer implemented error-based method according to claim 3, wherein the relative error weights are based on temporal distances between the errors and the breakdowns.

5. The computer implemented error-based method according to claim 4, wherein considering the relative error weights based on the temporal distances between the errors and the breakdowns, further comprises
determining remaining times until a breakdown of the apparatus for said each type of said error, wherein the remaining times are given by the linearly decreasing remaining useful life at each time a number of errors is increasing by the value of one,
calculating the relative error weights based on the remaining times for said each type of said error, mapping the points in the error space at weighted coordinates.

6. The computer implemented error-based method according to claim 3, wherein the relative error weights are based on frequencies of the errors occurring.

7. The computer implemented error-based method according to claim 6, wherein considering the relative error weights based on the frequencies of the errors occurring, further comprises
determining remaining times until a breakdown of the apparatus for each type of said error,
wherein the remaining times are given by the linearly decreasing remaining useful life at each time a number of errors is increasing by the value of one,
calculating parameters based on the remaining times for each type of said error, respectively,
calculating the relative error weights based on the parameters, wherein each relative error weight for a specific type of said error is indicative of a frequency of the error occurring,
mapping the points in the error space at weighted coordinates in the error space.

8. The computer implemented error-based method according to claim 5,
wherein total times are calculated for each type of said error by summing up the remaining times of a corresponding error,
wherein each relative error weight for a specific type of said error is a logarithm of a quotient of a sum of the total times of all types of said errors and a total time of the corresponding error.

9. The computer implemented error-based method according to claim 1, wherein the time series include information about the previous runs of at least one further apparatus of a same type as the apparatus equipped with a second plurality of sensors.

10. The computer implemented error-based method according to claim 1, further comprising
determining categories comprising different categories for different time slots according to the remaining useful life as calculated,
performing a supervised training of a machine learning algorithm using the categories or numeric values of the remaining useful life as calculated as target variables of a training data set, wherein the training data set contains the time series.

11. The computer implemented error-based method according to claim 10, further comprising predicting a category by the machine learning algorithm based on sensor data and error data of the apparatus in operation and the remaining useful life that is calculated of the previous runs.

12. A system comprising a plurality of sensors and means designed to perform method steps of a computer implemented error-based method for calculating a remaining useful life of an apparatus, said computer implemented error-based method comprising:
providing acquired time-series of previous runs of the apparatus containing data of the plurality of sensors of the apparatus and acquiring a time series containing the data of the plurality of sensors with respect to a current run of the apparatus,
wherein the apparatus is a pitch system of a wind turbine,
wherein each sensor of said plurality of sensors of the apparatus is configured to monitor a parameter of the apparatus or a parameter of an environment of the apparatus, respectively,
wherein cumulative counts of errors occurring during a run of the apparatus are calculated for each type of an error and provided within the time series,
wherein the error occurs when the parameter of the apparatus or the parameter of the environment of the apparatus as monitored by a sensor breaches a predefined threshold,
wherein a linearly decreasing remaining useful life for each previous run of the apparatus indicating breakdowns of the apparatus by a value of zero is calculated and provided within the time series,
mapping the breakdowns of the apparatus as points in an error space,
wherein each dimension of the error space refers to one type of the error, respectively,
wherein breakdown points are mapped at coordinates which represent cumulative error counts at times of the breakdowns,
mapping a test point in the error space, wherein the test point represents the cumulative error counts for the apparatus in operation,
identifying at least two nearest breakdown points with respect to the test point by calculating and comparing distances of the test point to all of the breakdown points mapped in the error space,
calculating the remaining useful life of the apparatus which is a function of a quotient of a distance of the test point to an origin of the error space and a mean distance of the at least two nearest breakdown points to the origin.

13. A non-transitory computer program product comprising instructions which cause a system comprising a plurality of sensors and means designed to carry out method steps of a computer implemented error-based method for calculating a remaining useful life of an apparatus, said computer implemented error-based method comprising:
providing acquired time-series of previous runs of the apparatus containing data of the plurality of sensors of the apparatus and acquiring a time series containing the data of the plurality of sensors with respect to a current run of the apparatus,
wherein the apparatus is a pitch system of a wind turbine,
wherein each sensor of said plurality of sensors of the apparatus is configured to monitor a parameter of the apparatus or a parameter of an environment of the apparatus, respectively,
wherein cumulative counts of errors occurring during a run of the apparatus are calculated for each type of an error and provided within the time series,
wherein the error occurs when the parameter of the apparatus or the parameter of the environment of the apparatus as monitored by a sensor breaches a predefined threshold,
wherein a linearly decreasing remaining useful life for each previous run of the apparatus indicating breakdowns of the apparatus by a value of zero is calculated and provided within the time series,
mapping the breakdowns of the apparatus as points in an error space,
wherein each dimension of the error space refers to one type of the error, respectively,
wherein breakdown points are mapped at coordinates which represent cumulative error counts at times of the breakdowns,
mapping a test point in the error space, wherein the test point represents the cumulative error counts for the apparatus in operation,
identifying at least two nearest breakdown points with respect to the test point by calculating and comparing distances of the test point to all of the breakdown points mapped in the error space,
calculating the remaining useful life of the apparatus which is a function of a quotient of a distance of the test point to an origin of the error space and a mean distance of the at least two nearest breakdown points to the origin.

* * * * *